Jan. 1, 1924
E. ROLKER
ANIMAL TRAP
Original Filed April 23, 1921    2 Sheets-Sheet 1
1,479,677
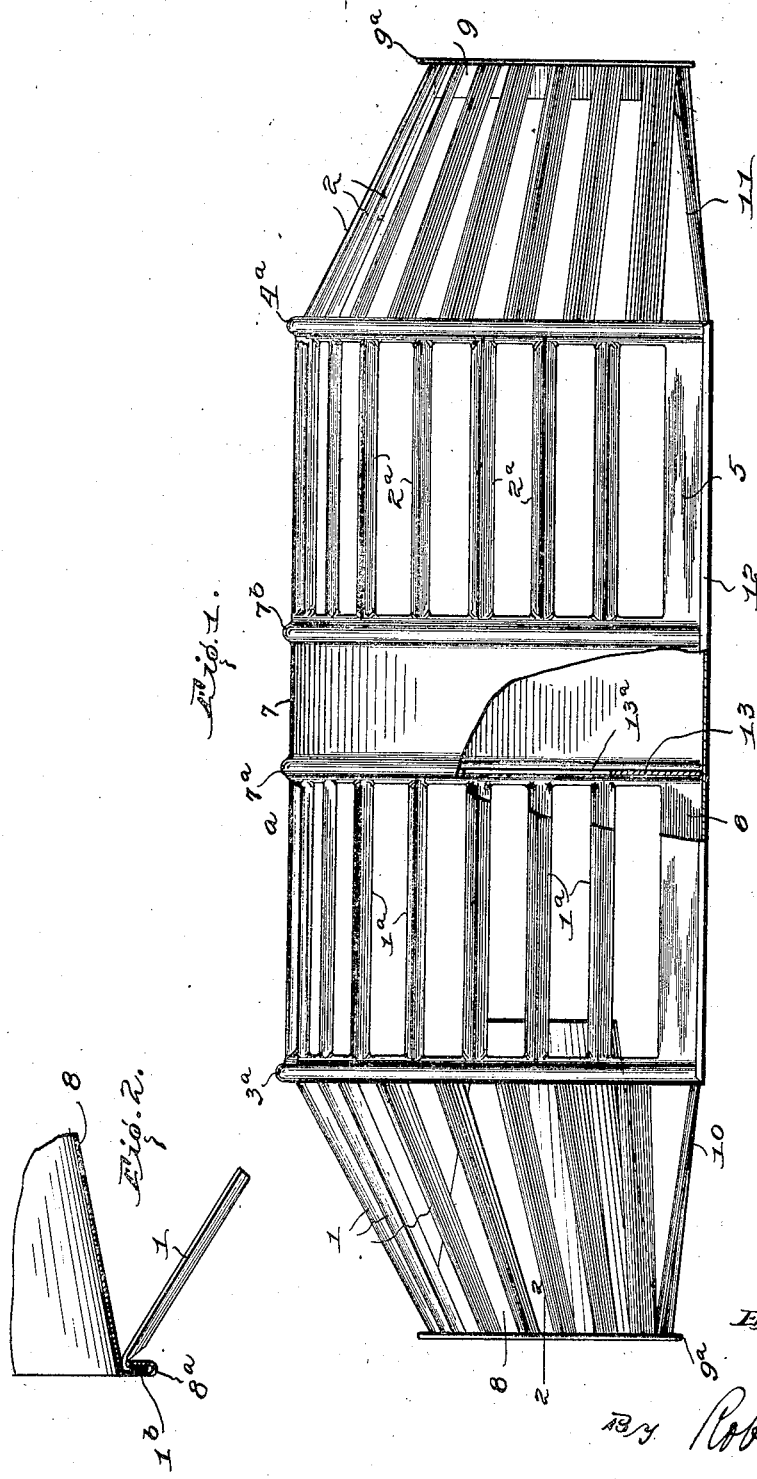

Jan. 1, 1924 1,479,677
E. ROLKER
ANIMAL TRAP
Original Filed April 23, 1921   2 Sheets-Sheet 2
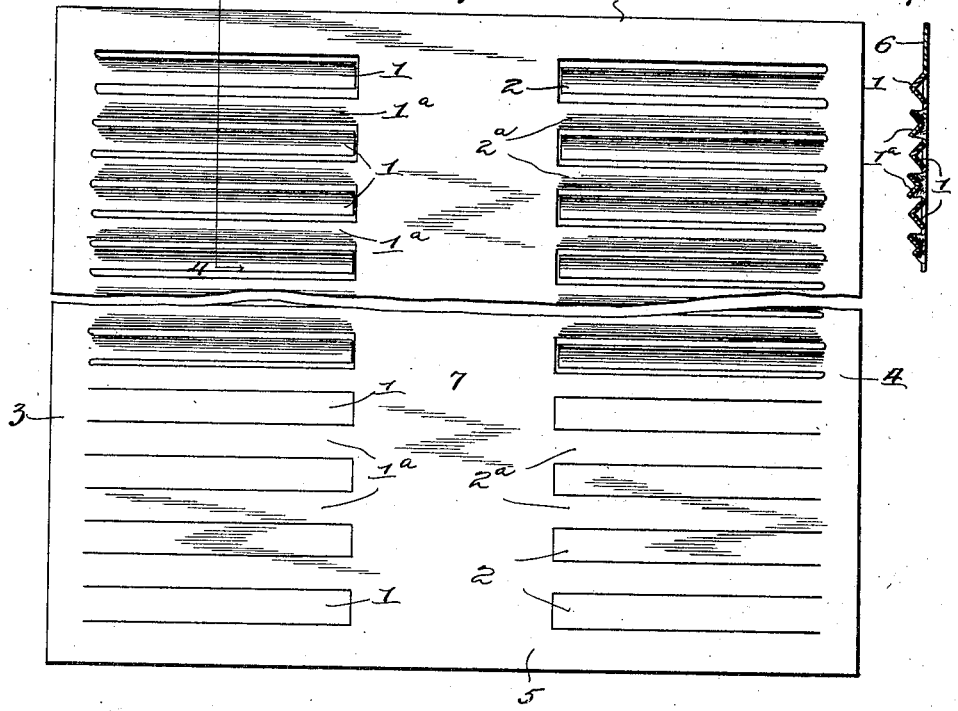
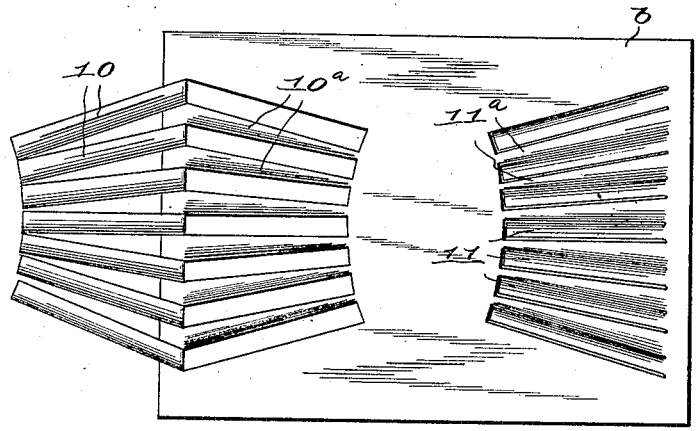
Inventor.
Edwin Rolker
By Robert Watson
Attorney.

Patented Jan. 1, 1924.

1,479,677

UNITED STATES PATENT OFFICE.

EDWIN ROLKER, OF BALTIMORE, MARYLAND, ASSIGNOR TO MILTON ROBERTS, OF BALTIMORE COUNTY, MARYLAND.

ANIMAL TRAP.

Application filed April 23, 1921, Serial No. 463,846. Renewed June 2, 1923.

*To all whom it may concern:*

Be it known that I, EDWIN ROLKER, a citizen of the United States, residing at Baltimore, in the State of Maryland, have invented certain new and useful Improvements in Animal Traps, of which the following is a specification.

This invention relates to improvements in animal traps, made of sheet metal. The purpose of the invention is to provide a trap which is strong and durable and which may be made with a minimum amount of metal and labor. The body of the trap may be made from a single rectangular sheet of metal, but I preferably use two sheets, one for the base and the other to form the top. In each sheet, I punch two transverse series of tongues which are connected to the sheet near the ends of the latter and extend toward the center of the sheet. This leaves between the tongues two series of parallel bars. The bars and tongues are longitudinally corrugated to strengthen their resistance to lateral pressure, the corrugations for the bars being the reverse of those in the tongues. The sheet which forms the top and sides of the trap is then corrugated transversely at its ends and central portion and simultaneously bent into semicylindrical form. The convex sides of the transverse corrugations in the body and of the corrugations in the bars and the concave sides of the tongues are then on the outer side of the form. The tongues are then pressed inwardly and bent sharply over upon themselves, at their junctures with the ends of the sheet, and extended outwardly beyond the ends of the sheet. When so bent and extended, the convex sides of the tongues will be presented at the outer side of the structure. Annular sheet metal entrance and exit fittings are provided for the ends of the trap, and the extended tongues converge toward and are secured to these fittings. The base or bottom of the trap is made in a similar manner except that it remains flat and does not require the transverse corrugations.

In the accompanying drawing,

Fig. 1 is a side view of the trap;

Fig. 2 is a detail of the end of the trap, taken in section on the line 2—2 of Fig. 1;

Fig. 3 is a top plan view of the metal sheet, partly broken away, punched to form the top and sides of the trap, the sheet being shown partly corrugated;

Fig. 4 is a section on the line 4—4 of Fig. 3; and,

Fig. 5 is a top plan view, on a smaller scale, of a sheet forming the bottom of the trap, the tongues at one end being shown extended beyond the ends of the sheets.

Referring to the drawing, (Figs. 3 and 4) A indicates a rectangular metal sheet from which the top a (Fig. 1) of the frame is formed. This sheet is punched to form two transverse series of parallel tongues, 1 and 2, with intermediate bars 1ª and 2ª. The free ends of the tongues are toward the center of the sheet and their attached ends toward the ends of the sheet, relatively narrow marginal strips 3 and 4 being left at the ends, and similar strips 5 and 6 at the sides, and a relatively wide unpunched strip 7 is left at the center of the sheet. After the tongues have been punched, they are longitudinally corrugated in one direction and the intermediate bars are longitudinally corrugated in the other direction, these corrugations being for the purpose of strengthening the tongues and bars. The sheet is corrugated transversely along the ends, forming the beads 3ª and 4ª in Fig. 1, and along the central strip, forming the beads 7ª, and the sheet is bent into semi-cylindrical form. The convex sides of the bars and of the transverse beads are then on the outer side of the semi-cylindrical form while the concave sides of the tongues are outermost. The tongues are then pressed inwardly and doubled sharply over on themselves, adjacent the ends of the sheet, and extended outwardly beyond the ends, as shown in Fig. 1. The convex sides of the tongues will then be presented outwardly. These tongues in the complete trap converge, and the free ends of the tongues 1 are connected to an annular entrance piece 8, while the tongues 2 are connected to an annular exit piece 9. The preferred way of connecting the tongues to the annular pieces is to bend the ends of the tongues over to form shoulders, as shown at 1ᵇ, in Fig. 2, and the entrance piece or exit piece, as the case may be, has an annular flange which is crimped over the tongues. In Fig. 2, the annular flange 8ª, of the entrance piece 8, is crimped over the shoulder 1ᵇ, on one of the tongues 1. In the same manner, the tongues 2 are connected to the entrance piece 9, which is provided with a flange 9ª.

The base of the trap, as shown in Fig. 5, comprises a rectangular plate B from which tongues 10 are punched out at one end and tongues 11 are punched out at the other end, leaving intermediate bars 10ª and 11ª. The tongues, instead of being punched out parallel with one another, are punched on a long radius, as shown, so that when they are bent forward, as shown at the left in Fig. 5, they will converge. These tongues 10 and 11 are corugated longitudinally and bent over on the upper side of the sheet, the convex sides of the corrugations being uppermost when connected to the top to form the trap. The reason for having the convex sides of the tongues on the bottom piece uppermost is to avoid having depressions which would collect dirt, which would be the case if the concave sides of the tongues were uppermost when in position on the trap. The bottom is secured to the top portion by turning up a flange 12 at each side of the bottom piece and securing it by soldering, or otherwise, to the edges 5 and 6 of the top piece. The tongues 10 and 11 of the bottom piece are connected to the entrance and exit pieces in the same manner as the tongues 1 and 2. When thus secured, the trap forms a complete cagelike structure, as shown in Fig. 1. Within this structure, before the parts are put together, is arranged a partition 13, having an opening 13ª for the animal to pass through, and the usual devices for preventing the return of the animal are provided but not shown. It will be understood also that the usual cap-piece will be placed over the annular exit piece to prevent the escape of the animal until said cap-piece is removed.

What I claim is:

1. An animal trap comprising a top composed of a metal sheet punched to provide two transverse series of spaced bars, extending lengthwise of the top, and intermediate tongues, the latter bent over at the ends of the sheet and extended beyond its ends, and entrance and exit fittings secured to the ends of the tongues.

2. An animal trap comprising a top composed of a metal sheet punched to provide two transverse series of spaced bars, extending lengthwise of the top, and intermediate tongues, the latter bent over at the ends of the sheet and converging beyond its ends, and annular entrance and exit fittings secured to the ends of the tongues.

3. An animal trap comprising a top composed of a metal sheet punched to provide two transverse series of spaced bars, extending lengthwise of the top, and intermediate tongues, said bars and tongues being longitudinally corrugated, the corrugations in the bars being the reverse of those in the tongues, said tongues being bent over at the ends of the sheet and extended beyond its ends, and entrance and exit fittings secured to the ends of the tongues.

4. An animal trap comprising a top composed of a metal sheet punched to provide two transverse series of spaced bars, extending lengthwise of the top, and intermediate tongues, the latter bent inwardly at the ends of the sheet, and thence extended beyond its ends and converging, and annular entrance and exit fittings secured to the ends of the tongues.

5. An animal trap comprising a top, and a base secured to the top, said top and base composed of metal sheets, each punched to provide two transverse series of spaced bars extending lengthwise thereof, and intermediate tongues, the latter bent over at the ends of the sheet and extended beyond its ends, and entrance and exit fittings secured to the ends of the tongues.

6. An animal trap comprising a top, and a base secured to the top, said top and base composed of metal sheets, each punched to provide two transverse series of spaced bars extending lengthwise thereof, and intermediate tongues, the latter bent over at the ends of the sheet and extended beyond its ends, the free ends of the tongues being bent to provide shoulders, and annular sheet metal entrance and exit fittings crimped on to said shoulders.

In testimony whereof I affix my signature.

EDWIN ROLKER.